US007882595B2

(12) United States Patent
Lee et al.

(10) Patent No.: US 7,882,595 B2
(45) Date of Patent: Feb. 8, 2011

(54) HANDLE FOR DOOR OF REFRIGERATOR AND METHOD FOR MANUFACTURING THE SAME

(75) Inventors: Byung Kil Lee, Gwangju (KR); Jin Hwan Bae, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 189 days.

(21) Appl. No.: 11/906,419

(22) Filed: Oct. 2, 2007

(65) Prior Publication Data

US 2008/0086843 A1 Apr. 17, 2008

(30) Foreign Application Priority Data

Oct. 17, 2006 (KR) ..................... 10-2006-0100722

(51) Int. Cl.
*A47J 45/06* (2006.01)

(52) U.S. Cl. .................... 16/412; 16/436; 16/DIG. 12; 16/DIG. 19

(58) Field of Classification Search .................. 16/412, 16/436, DIG. 12, DIG. 19; 264/209.1; 428/36.4, 428/36.91
See application file for complete search history.

(56) References Cited

U.S. PATENT DOCUMENTS

| | | | | |
|---|---|---|---|---|
| RE9,318 | E * | 8/1880 | Battelle | 138/149 |
| 5,659,927 | A * | 8/1997 | Shanok et al. | 16/412 |
| 5,740,587 | A * | 4/1998 | Onai et al. | 16/412 |
| 6,094,781 | A * | 8/2000 | Jansson et al. | 16/431 |
| 6,148,483 | A * | 11/2000 | DeGraff | 16/430 |
| 6,197,392 | B1 * | 3/2001 | Jones | 428/34.9 |
| 6,345,556 | B1 * | 2/2002 | Lin | 81/177.1 |
| 6,546,597 | B2 * | 4/2003 | Atalla et al. | 16/436 |
| 6,609,274 | B2 * | 8/2003 | Christensen et al. | 16/412 |
| 6,889,405 | B2 * | 5/2005 | Ritrovato et al. | 16/430 |
| 6,959,469 | B2 * | 11/2005 | Blauer et al. | 16/431 |
| 6,968,599 | B2 * | 11/2005 | Blauer et al. | 16/431 |
| 2003/0024543 | A1 * | 2/2003 | Wolf | 132/212 |
| 2003/0090187 | A1 * | 5/2003 | Kawamura et al. | 312/401 |

FOREIGN PATENT DOCUMENTS

| | | |
|---|---|---|
| JP | 11-237169 | 8/1999 |

* cited by examiner

*Primary Examiner*—Victor Batson
*Assistant Examiner*—Roberta Delisle
(74) *Attorney, Agent, or Firm*—Ohlandt, Greeley, Ruggiero & Perle, L.L.P.

(57) ABSTRACT

A handle for a door of a refrigerator having a hollow rod shape, which extends in the longitudinal direction of the door and disposed on the front surface of the door so as to be improved in productivity and aesthetic quality, and a method for manufacturing the same. A handle for a door of a refrigerator, which has a main body having a storage chamber provided with an opened front surface, doors provided on the front surface of the main body for opening and closing the storage chamber, and handles respectively provided on the doors, extending in the longitudinal direction of the doors and having a hollow rod shape, includes a first resin layer making the shape of the handle and made of a first resin comprising glass fibers for reinforcing the rigidity of the handle; and a second resin layer formed on the outer surface of the first resin layer and made of a second resin.

11 Claims, 8 Drawing Sheets

HANDLE FOR DOOR OF REFRIGERATOR AND METHOD FOR MANUFACTURING THE SAME

CROSS-REFERENCE TO RELATED APPLICATION

This application claims the benefit of Korean Patent Application No. 2006-100722, filed Oct. 17, 2006 in the Korean Intellectual Property Office, the disclosure of which is incorporated herein by reference.

BACKGROUND OF THE INVENTION

1. Field of the Invention

The present disclosure relates to a handle for a door of a refrigerator and a method for manufacturing the same, and more particularly, to a handle for a door of a refrigerator having a rod shape, which extends in the longitudinal direction of the door and disposed on the front surface, of the door for opening and closing a storage chamber, and a method for manufacturing the handle.

2. Description of the Related Art

Generally, refrigerators are apparatuses, which refrigerate a storage chamber in a main body using cool air generated through an evaporator in a refrigeration cycle so as to keep articles, stored in the storage chamber, in a cold or frozen state.

Refrigerators generally include a main body having a storage chamber, front surface of which is opened, and doors provided on the front surface of the main body for opening and closing the storage chamber.

The doors are hinged to the main body, and are rotated to open and close the storage chamber. A handle for allowing a user to easily open and close the corresponding door is provided on the front surface of each of the doors.

The storage chamber is divided into a refrigerating chamber and a freezing chamber, and the doors include refrigerating and freezing chamber doors for independently opening and closing the refrigerating and freezing chambers. Recently, the refrigerating and freezing chambers are divided from each other side by side, and the refrigerating and freezing chamber doors are provided at both sides of the front surface of the main body in the longitudinal direction of the main body.

Among the above refrigerators, there is a refrigerator with handles for doors, which have a rod shape extending in the longitudinal direction of the doors so that a child of short stature or an adult in a sitting posture can easily open and close the doors.

FIG. 1 illustrates a conventional handle 1 for a door of a refrigerator.

As shown in FIG. 1, the handle 1 has a rod shape, which extends in the longitudinal direction of a door 2, and is protruded forwardly in a curved line so that a user easily, holds the handle 1 by inserting his/her hand into a gap between the handle 1 and the front surface of the door 2.

Brackets 3 and 4 are installed respectively at the upper and lower ends of the handle 1 so as to fix the handle 1 to the front surface of the door 2. The handle 1 is generally manufactured by extrusion using aluminum in consideration of the rigidity of the handle 1.

However, when the handle 1 is manufactured by extrusion using aluminum with an extruder, the manufacturing process is complicated and production costs are excessively high, thus lowering the productivity of the manufacturing process and deteriorating the aesthetic quality of the refrigerator.

That is, in order to reduce a loss of a material, i.e., aluminum, which is expensive, and assure a designated rigidity, the handle 1 having a hollow rod shape is provided by extrusion using aluminum with the extruder.

Further, as shown in FIG. 1, the handle 1 having a long length may be obtained by respectively preparing a plurality of pipe members 1*a*, 1*b*, and 1*c* having a small length by extrusion and connecting the plurality of pipe members 1*a*, 1*b*, and 1*c* using screws or by welding. In this case, a step for connecting the pipe members 1*a*, 1*b*, and 1*c* is additionally required.

Before the pipe members 1*a*, 1*b*, and 1*c* are connected by welding, the pipe members 1*a*, 1*b*, and 1*c* are bent to one side by a press bending process so as to have a designated curvature, and are polished by a chemical polishing process, such as anodizing, so as to smooth the rough surfaces of the pipe members 1*a*, 1*b*, and 1*c*.

Accordingly, in case of the above conventional handle 1, steps for connecting, bending, and polishing the pipe members 1*a*, 1*b*, and 1*c* are additionally required. Thereby, the overall process for manufacturing the handle 1 is complicated and the productivity of the process is lowered.

Further, the above conventional handle 1 are disadvantageous in that the pipe members 1*a*, 1*b*, and 1*c* are easily detached from each other to spoil the appearance of the handle 1, static electricity occurs due to the use of aluminum, and, when a user holds the handle 1 in a low temperature state, such as winter, the user feels a chill.

SUMMARY OF THE INVENTION

Therefore, one aspect of the disclosure is to provide a handle for a door of a refrigerator having a hollow rod shape, which extends in the longitudinal direction of the door and disposed on the front surface of the door so as to be improved in productivity and aesthetic quality, and a method for manufacturing the same.

In accordance with one aspect, the present disclosure provides a handle for a door of a refrigerator, which has a main body having a storage chamber provided with an opened front surface, doors provided on the front surface of the main body for opening and closing the storage chamber, and handles respectively provided on the doors, extending in the longitudinal direction of the doors and having a hollow rod shape, the handle comprising a first resin layer making the shape of the handle and made of a first resin comprising glass fibers for reinforcing the rigidity of the handle; and a second resin layer formed on the outer surface of the first resin layer and made of a second resin.

The second resin is ABS resin, and the first resin is a mixture comprising ABS resin of 70-90 percent by weight and glass fibers of 10-30 percent by weight.

The ratio of the total thickness of the handle and the thickness of the second resin layer is 250:1-50:1.

A protective film is provided on the outer surface of the second resin layer by coating the outer surface of the second resin layer with a liquid material.

In accordance with another aspect, the present disclosure provides a handle for a door of a refrigerator, which has a main body having a storage chamber provided with an opened front surface, doors provided on the front surface of the main body for opening and closing the storage chamber, and handles respectively provided on the doors, extending in the longitudinal direction of the doors and having a hollow rod shape being protruded forwardly in a curved line, the handle being integrally formed by extrusion using resin such that the cross section of the rear portion thereof is larger than the cross section of the front portion thereof.

A protruding rib for increasing the cross section is provided on the inner surface the rear portion of the handle.

The handle comprises a first resin layer making the shape of the handle and made of a first resin comprising glass fibers for reinforcing the rigidity of the handle; and a second resin layer formed on the outer surface of the first resin layer and made of a second resin, wherein the protruding rib is provided on the first resin layer.

In accordance with yet another aspect, the present disclosure provides a method for manufacturing a handle for a door of a refrigerator, which has a main body having a storage chamber provided with an opened front surface, doors provided on the front surface of the main body for opening and closing the storage chamber, and handles respectively provided on the doors, extending in the longitudinal direction of the doors and having a hollow rod shape being protruded forwardly in a curved line, wherein the handle is integrally formed by extrusion using resin such that the cross section of the rear portion thereof is larger than the cross section of the front portion thereof.

The method comprises forming a first resin layer making the shape of the handle and made of a first resin comprising glass fibers for reinforcing the rigidity of the handle; and forming a second resin layer formed on the outer surface of the first resin layer and made of a second resin, simultaneously with the formation of the first resin layer, wherein the first and second resin layers are integrally formed by dual extrusion such that the cross section of the rear portion of the first resin layer is larger than the cross section of the front portion of the first resin layer.

The method may further comprises coating a protective film on the outer surface of the second resin layer using a liquid material after the first and second resin layers formed by dual extrusion are dried.

BRIEF DESCRIPTION OF THE DRAWINGS

These and/or other aspects and advantages of the disclosure will become apparent and more readily appreciated from the following description of the embodiments, taken in conjunction with the accompanying drawings in which.

DETAILED DESCRIPTION OF THE PREFERRED EMBODIMENTS

Figure 1:
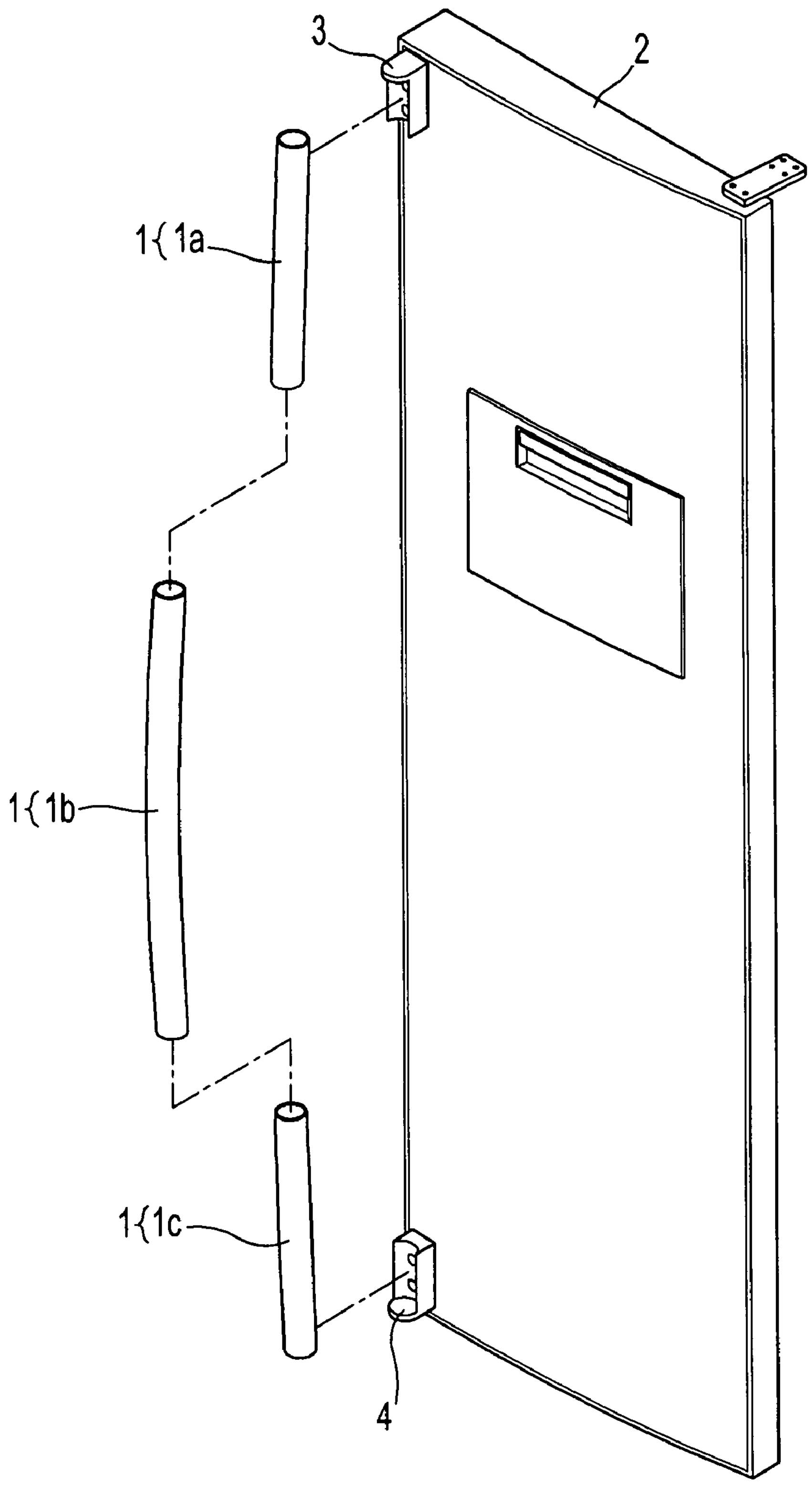
FIG. 1 is an exploded perspective view illustrating the structure of a conventional handle for a door of a refrigerator.

Reference will now be made in detail to the embodiments of the present disclosure, an example of which is illustrated in the accompanying drawings, wherein like reference numerals refer to like elements throughout. The embodiments are described below to explain the present disclosure by referring to the annexed drawings.

Figure 2:
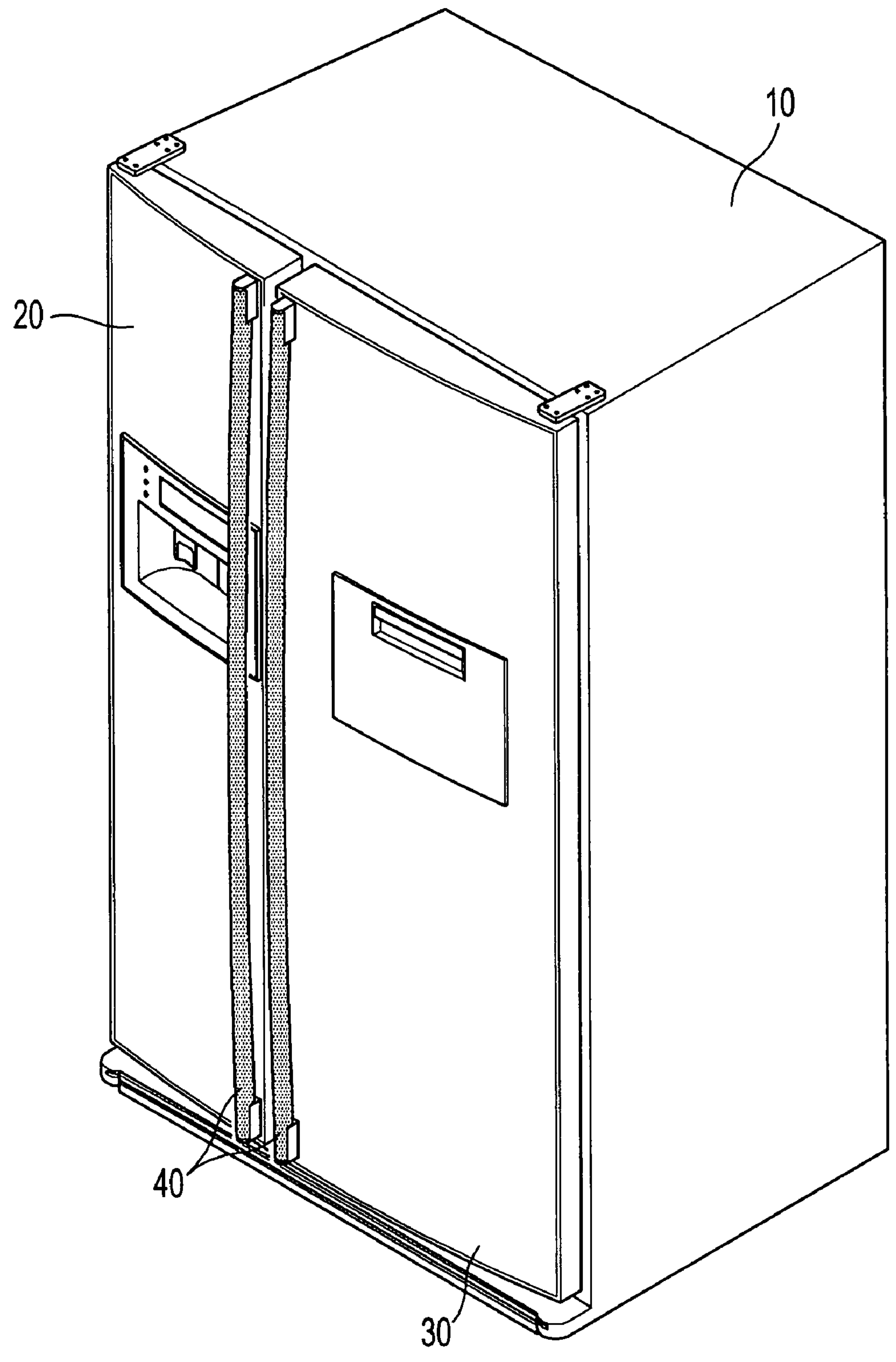
FIG. 2 is a perspective view illustrating the whole structure of a refrigerator employing a handle for a door of a refrigerator in accordance with an embodiment of the present disclosure.

FIG. 2 illustrates the structure of a refrigerator employing a handle for door of a refrigerator in accordance with an embodiment of the present disclosure. As shown in FIG. 2, the refrigerator includes a main body 10 having a storage chamber (not shown), the front surface of which is opened, and doors 20 and 30 rotatably hinged to the front surface of the main body 10 for opening and closing the storage chamber (not shown).

The storage chamber (not shown) is divided into a freezing chamber provided on the left side and a refrigerating chamber provided on the right side. The doors 20 and 30 include a first door 20 provided on the left side for opening and closing the freezing chamber and a second door 30 provided on the right side for opening and closing the refrigerating chamber. The doors 20 and 30 extend in the longitudinal direction of the main body 10, and handles 40 are respectively provided on the front surfaces of the doors 20 and 30 so that a user can easily open and close the doors 20 and 30.

The handles 40 having a hollow rod shape extend in the longitudinal direction of the doors 20 and 30 so that a child of short stature or an adult in a sitting posture can easily hold the handles 40 to open and close the doors 20 and 30, and are protruded forwardly in a curved line so that a user can easily hold the handles 40 by inserting his/her hand into a gap between the handles 40 and the front surfaces of the doors 20 and 30.

Figure 3:
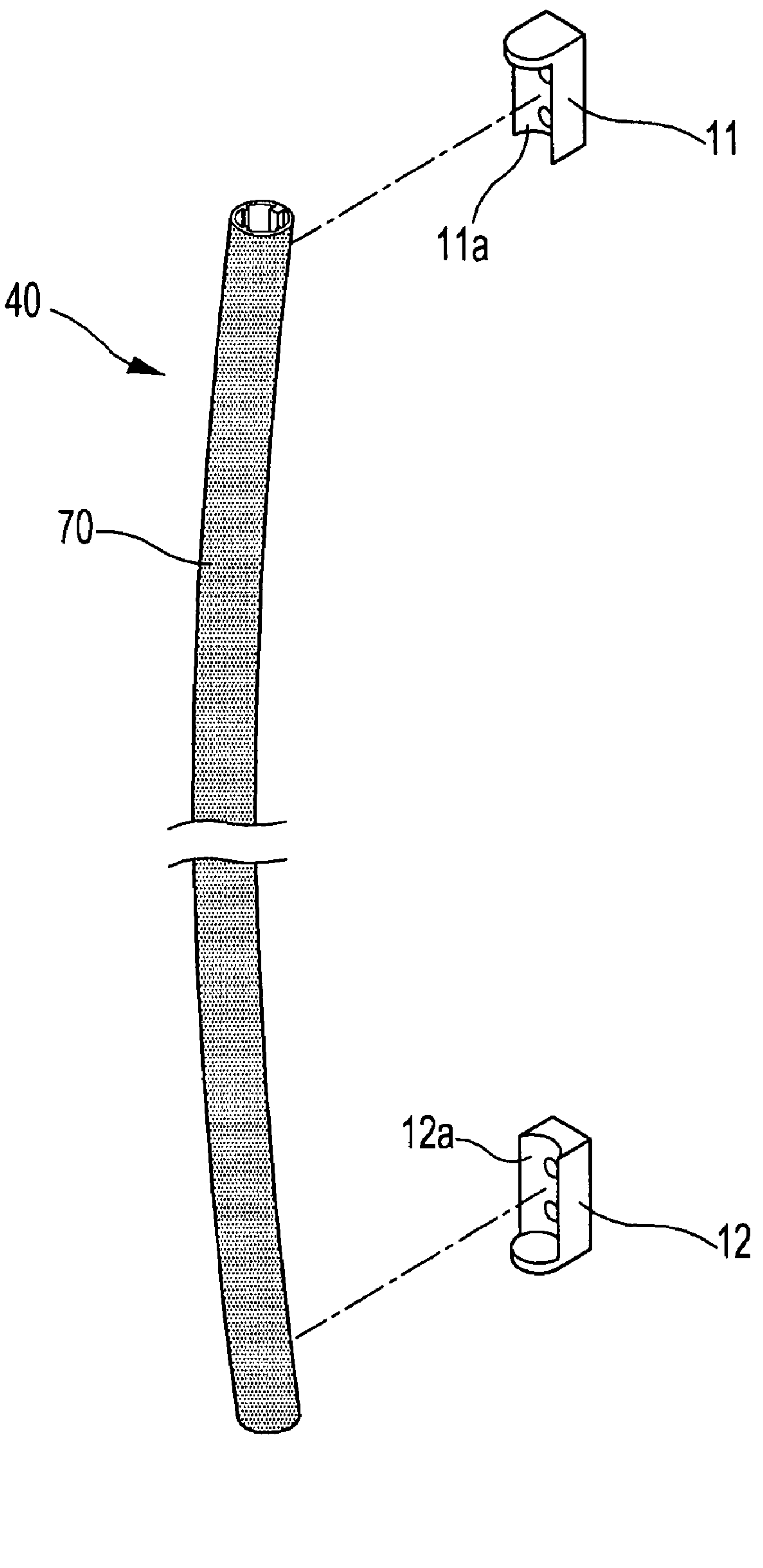
FIG. 3 is a perspective view illustrating the whole structure of the handle in accordance with the embodiment of the present disclosure, in a state in which the handle is separated from the door.

As shown in FIG. 3, brackets 11 and 12 are installed respectively at the upper and lower ends of the handles 40 so as to fix the handles 40 to the front surfaces of the doors 20 and 30. Both ends of the handles 40 are fixed to the brackets 11 and 12 such that the ends of the handles 40 are inserted into reception grooves 11*a* and 12*a* formed in the brackets 11 and 12.

Figure 4:
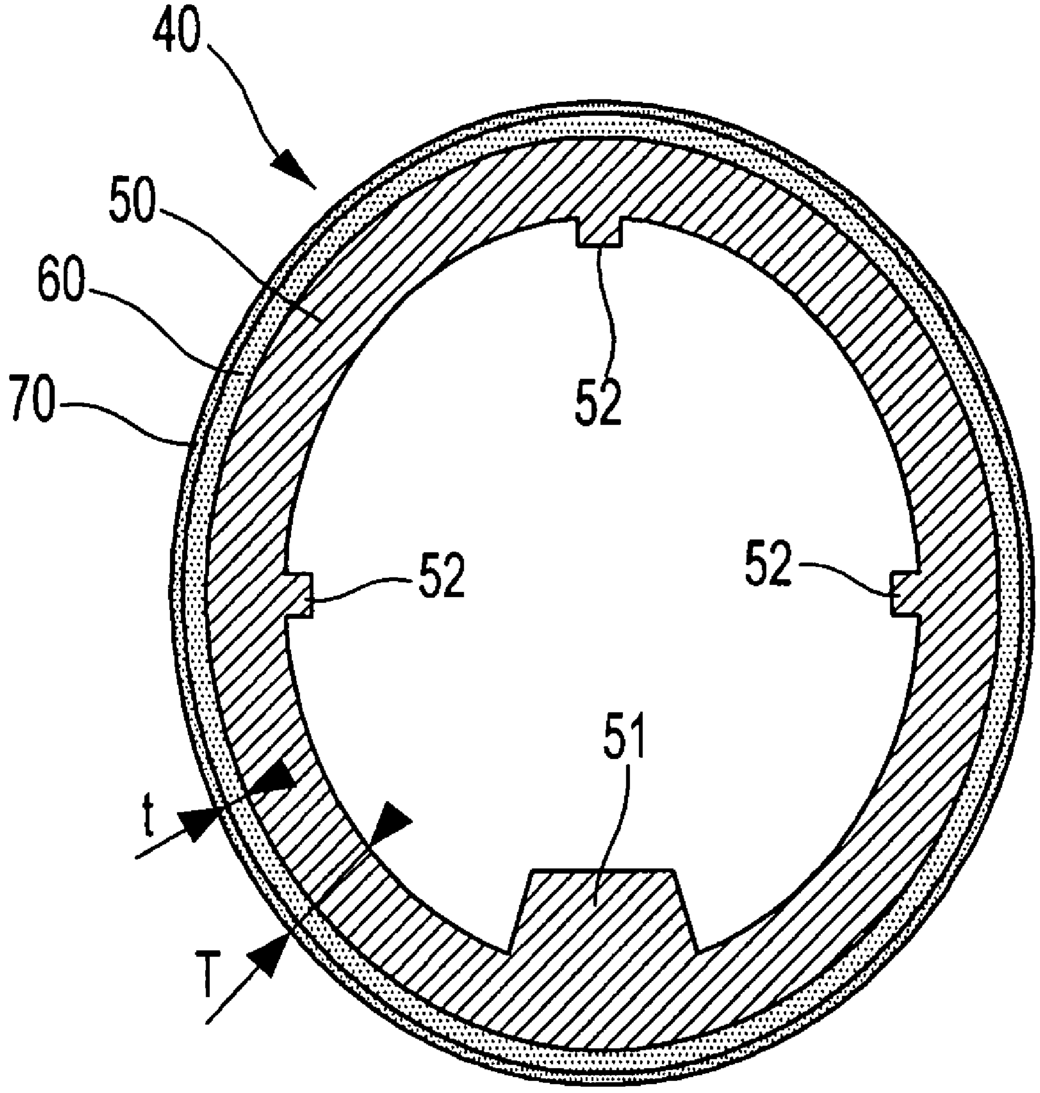
FIG. 4 is a sectional view of the handle in accordance with the embodiment of the present disclosure.

The handle 40 in accordance with this embodiment is manufactured by extrusion using resin so as to be improved in productivity and aesthetic quality. FIG. 4 illustrates the sectional structure of the handle 40 in detail.

As shown in FIG. 4, the handle 40 includes a first resin layer 50, which makes a fundamental shape of the handle 40 and is made of a first resin 50*a* including glass fibers for reinforcing the rigidity of the handle 40 so as to form the inner diameter of the handle 40.

The handle 40 in accordance with this embodiment is made of resin, which is relatively inexpensive compared with aluminum, thus being reduced in production costs. Further, the handle 40 includes the first resin layer 50 including glass fibers, thus having rigidity similar to that of the conventional handle made of aluminum.

Compared with the conventional handle, which is obtained by connecting a plurality of pipe members made of a metal and has a possibility that the pipe members are detached from each other, the above-described handle 40 having a hollow rod shape by extrusion using resin is improved in aesthetic quality. That is, the handle 40 has improved appearance and little possibility of generating static electricity, and, even when a user holds the handle 40 in a low temperature state, such as winter, the user scarcely feels a chill.

In this embodiment, a mixture of acrylonitrile butadiene styrene (ABS) resin and glass fibers is used as the first resin 50*a*. Here, the concentration of the glass fibers in the mixture is 10-30 percent by weight, and the concentration of the ABS resin in the mixture is 70-90 percent by weight.

t is generally known that ABS resin has a tensile strength of 400 kgf/cm$^2$, a flexural strength of 600 kgf/cm$^2$, and a flexural modulus of 20,000 kgf/cm$^2$. As a result of experimentation, the first resin 50*a* using the mixture of ABS resin and glass fibers has a mean tensile strength of 850 kgf/cm$^2$, a mean flexural strength of 1,100 kgf/cm$^2$, and a mean flexural modulus of 54,000 kgf/cm$^2$. That is, the tensile strength, the flexural strength, and the flexural modulus of the first resin 50*a* approximately double those of ABS resin. Accordingly, the handle 40 having a fundamental shape due to the use of the first resin 50*a* has higher rigidity than the conventional handle made of aluminum.

Further, a second resin layer 60 made of a second resin 60*a* is formed on the outer surface of the first resin layer 50, and a protective film 70 for forming the clean final appearance of the handle 40 is coated on the outer surface of the second resin layer 60 using a liquid material. Here, general ABS resin is used as the second resin 60*a*.

The first resin layer 50 is made of the first resin 50*a* including glass fibers and thus may have high surface roughness, and it is difficult to coat the protective film 70 on the outer surface of the first resin layer 50. On the other hand, the second resin layer 60 is made of the second resin 60*a* that does not include glass fibers and thus has lower surface roughness than the first resin layer 50. Accordingly, the second resin layer 60 having a small thickness is formed on the outer surface of the first resin layer 50 so that the protective film 70 is easily coated on the smooth outer surface of the second rein layer 60.

When the thickness (t) of the second resin layer 60 to the total thickness (T) of the handle 40 is excessively large and thus the thickness of the first resin layer 50 becomes relatively small, the rigidity of the handle 40 may be lowered. Accordingly, preferably, the ratio of the total thickness (T) of the handle 40 and the thickness (t) of the second resin layer 60 is 250:1-50:1. In this embodiment, since the total thickness (T) of the handle 40 is approximately 25 mm, it is preferable that the thickness (t) of the second resin layer 60 is 0.1-0.5 mm. For reference, the thickness of the protective film 70 is approximately 15-20 μm.

The cross section of the rear portion of the handle 40 is larger than that of the front portion of the handle 40 so that the handle 40 formed by extrusion using resin is protruded forwardly in a curved line without bending. This is caused by the property of resin in that it contracts significantly during drying compared with metal, such as aluminum. As described above, when the cross section of the rear portion of the handle 40 is larger than that of the front portion of the handle 40, the rear portion of the handle 40 contracts at a higher rate than the front portion of the handle 40 during drying after extrusion, thereby allowing the handle 40 to be protruded forwardly in a curved line.

In this embodiment, a protruding rib 51 is provided on the inner surface of the first resin layer 50 of the rear portion of the handle 40 in the longitudinal direction of the handle 40 so that the cross section of the rear portion of the handle 40 is larger than that of the front portion of the handle 40. For reference, non-described reference numeral 52 represents shape maintaining ribs, which have a smaller cross section than that of the protruding rib 51, for maintaining the shape of the handle 40.

The handle 40 is obtained by dual extrusion with a dual extrusion unit so that the first resin layer 50 and the second resin layer 60 provided on the outer surface of the first resin layer 40 are integrally formed, as described above. Hereinafter, a process for manufacturing the handle 40 including a dual extrusion process will be described in detail.

Figure 5:
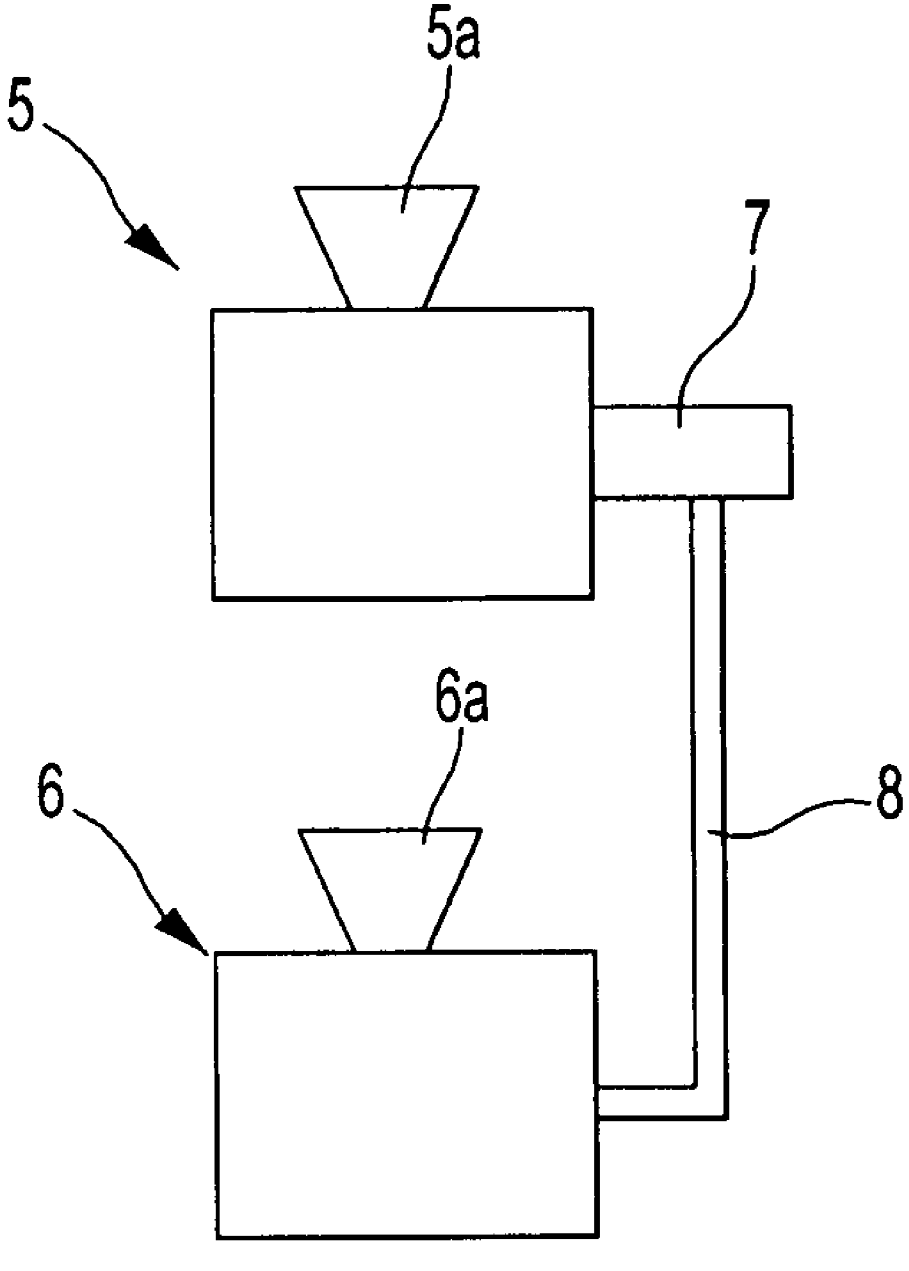
FIG. 5 is a schematic view of a dual extrusion unit used in a process for manufacturing a handle for a door of a refrigerator in accordance with an embodiment of the present disclosure.

FIG. 5 schematically illustrates a dual extrusion unit. The dual extrusion unit includes a main extrusion unit 5 having a hopper 5*a*, and a subsidiary extrusion unit 6 having a hopper 6*a*. A die 7 is provided on one end of the main extrusion unit 5. Each of the main extrusion unit 5 and the subsidiary extrusion unit 6 includes a heater (not shown) for melting a material and a transfer device (not shown) for transferring the molten material to the die 7. The subsidiary extrusion unit 6 is connected to the die 7 provided on the main extrusion unit 5 through a connection channel 8.

When the main extrusion unit 5 and the subsidiary extrusion unit 6 are driven under the condition that a material for the first resin 50*a* is supplied to the hopper 5*a* of the main extrusion unit 5 and a material for the second resin 60*a* is supplied to the hopper 6*a* of the subsidiary extrusion unit 6, the main extrusion unit 5 forms the first resin 50*a* in a molten state and transfers the molten first resin 50*a* to the die 7, and the subsidiary unit 6 forms the second resin 60*a* in a molten state and transfers the molten second resin 60*a* to the die 7.

Figure 6:
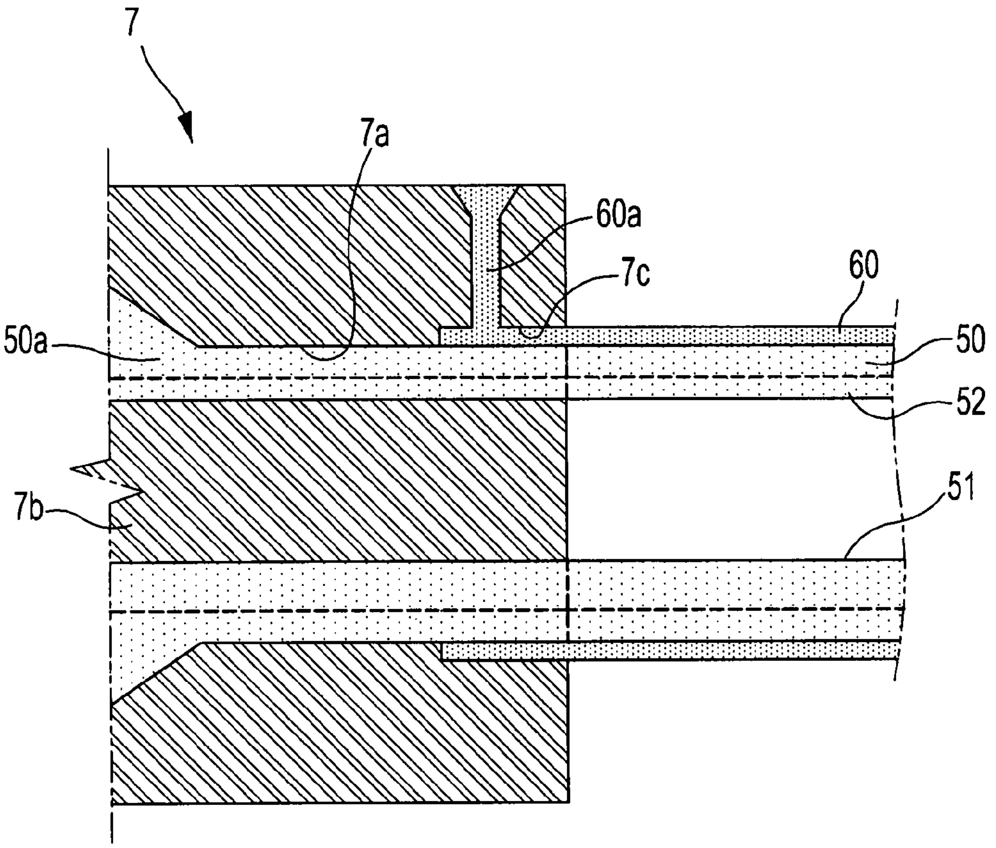
FIG. 6 is an enlarged sectional view of a die installed on a main extrusion unit out of the dual extrusion unit of FIG. 5, in a state in which extrusion is being performed.
Figure 7:
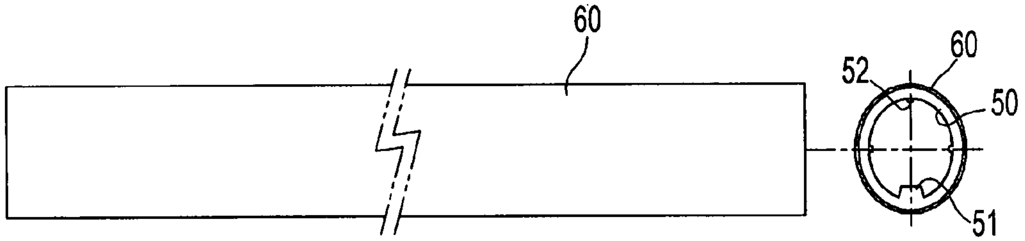
FIGS. 7 to 9 are side and sectional views for sequentially illustrating the process for manufacturing the handle in accordance with the embodiment of the present disclosure.

FIG. 6 illustrates the internal structure of the die 7. In FIG. 6, reference numeral 7*b* represents a core installed at an outlet 7*a* for forming a hollow inside the first resin layer 50. The first resin 50*a* transferred from the main extrusion unit 5 to the die 7 passes through the outlet 7*a* of the die in the outlet forming direction, and is discharged to the outside of the die 7. The second resin 60*a* transferred from the subsidiary extrusion unit 6 to the die 7 is supplied along a supply channel 7*c* formed around the outlet 7*a* of the die 7. Accordingly, a final product obtained through the die 7 has a structure in that the second resin layer 60 surrounds the hollow first resin layer 50, as shown in FIG. 7. Thereby, the first resin layer 50 and the second resin layer 60 are integrally formed.

Figure 8:
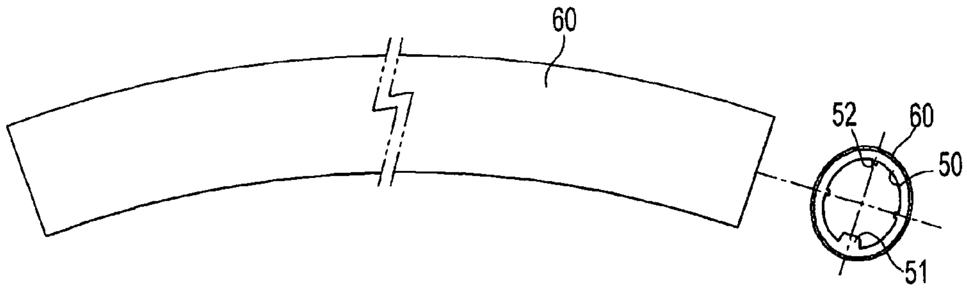

The first and second resin layers 50 and 60, which are integrally formed, are maintained in a straight line. Then, the rear portions of the first and second resin layers 50 and 60 contract at a higher rate than the front portions of the first and second resin layers 50 and 60 during drying due to a difference of cross sections between the rear and front portions of the first resin layer 50 by means of the protruding rib 51. Thereby, the first and second resin layers 50 and 60 are protruded forwardly in a curved line, as shown in FIG. 8.

Figure 9:
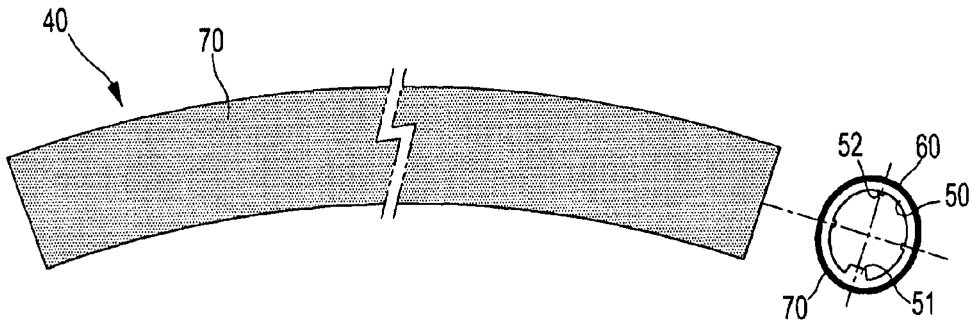

After the drying of the first and second resin layers 50 and 60 are completed, as shown in FIG. 9, the protective film 70 is formed by coating the outer surface of the second resin layer 60 with a liquid material. Thereby, the manufacture of the handle 40 is completed.

As described above, compared with the conventional handle formed by extrusion using aluminum, the handle 40 in accordance with this embodiment does not require steps of connecting pipe members, bending the pipe members, and chemically polishing the pipe members, thus being highly improved in productivity.

Figure 10:
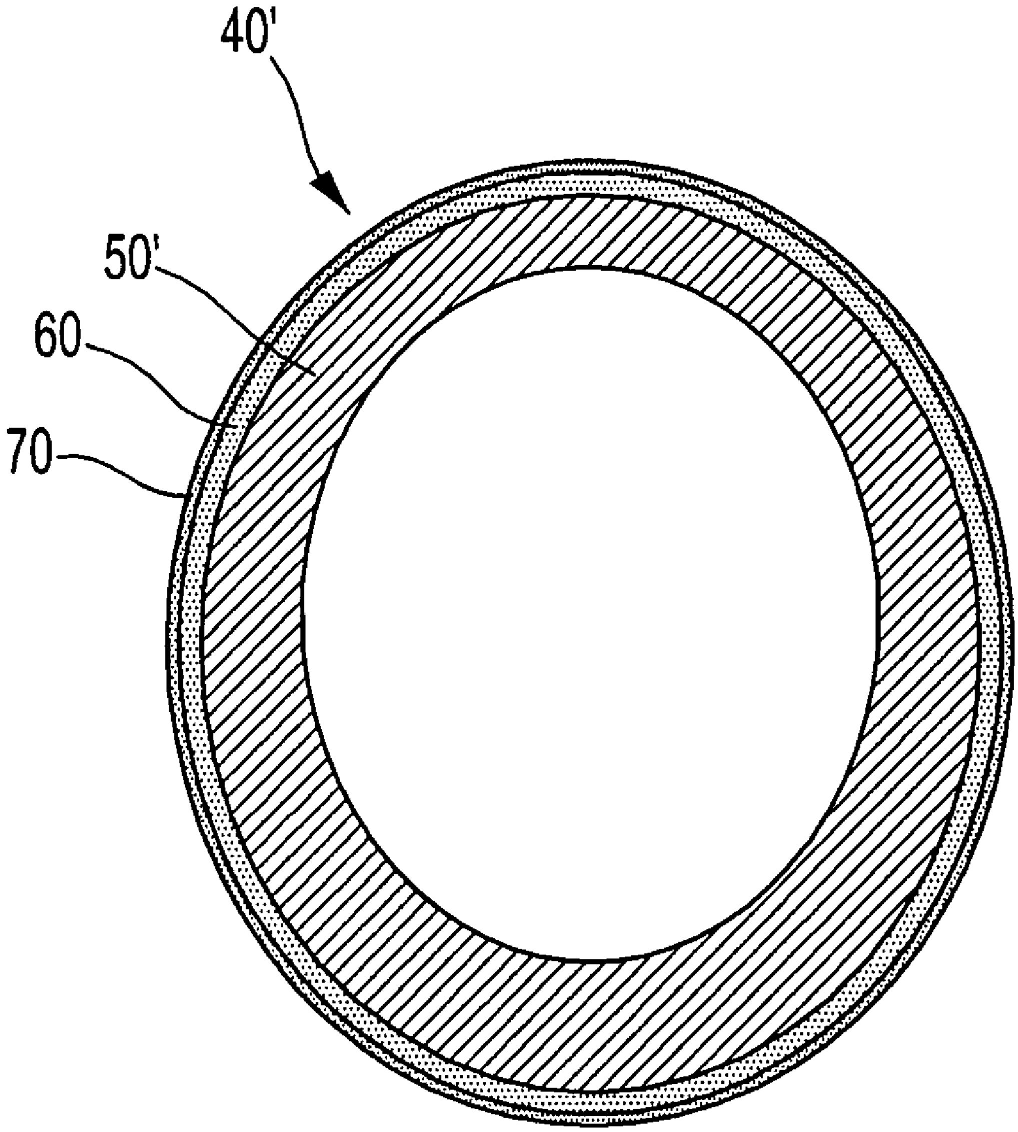
FIG. 10 is a sectional view of a handle for a door of a refrigerator in accordance with another embodiment of the present disclosure.

FIG. 10 illustrates the structure of a handle 40' for a door of a refrigerator in accordance with another embodiment of the present disclosure. In this embodiment, a first resin layer 50 does not include a protruding rib, and has a structure in that the cross section of the first resin layer 50 is gradually increased from the front portion thereof to the rear portion thereof. Although the handle 40' of this embodiment structurally differs from the handle 40 of the first embodiment, the cross section of the rear portion of the handle 40' is larger than that of the front portion of the handle 40', and thus the handle 40 is protruded forwardly in a curved line without bending, during drying after extrusion.

As apparent from the above description, the present disclosure provides a handle for a door of a refrigerator, which has a simple manufacturing process and reduced production costs and is improved in productivity and aesthetic quality, and a method for manufacturing the same.

Although embodiments of the disclosure have been shown and described, it would be appreciated by those skilled in the art that changes may be made in the disclosed embodiments without departing from the principles and spirit of the disclosure, the scope of which is defined in the claims and their equivalents.

What is claimed is:

1. A handle for a door of a refrigerator, which has a main body having a storage chamber provided with an opened front surface, doors provided on the front surface of the main body for opening and closing the storage chamber, and handles respectively provided on the doors, extending the longitudinal direction of the doors and having a hollow rod shape, said handle comprising:

a first resin layer making the shape of the handle and made of a first resin comprising glass fibers for reinforcing the rigidity of the handle; and a second resin layer formed on the outer surface of the first resin layer and made of ABS resin, wherein the outer surface of the second resin layer has a protective film provided by coating the outer surface of the second resin layer with a liquid material.

2. A handle for a door of a refrigerator, which has a main body having a storaqe chamber provided with an opened front surface, doors provided on the front surface of the main body for opening and closing the storage chamber, and handles respectively provided on the doors, extending the longitudinal direction of the doors and having a hollow rod shape, said handle comprising:

a first resin layer making the shape of the handle and made of a first resin comprising glass fibers for reinforcing the rigidity of the handle; and a second resin layer formed on the outer surface of the first resin layer and made of a second resin, wherein the first resin is a mixture comprising ABS resin of 70-90 percent by weight and glass fibers of 10-30 percent by weight.

3. A handle for a door of a refrigerator, which has a main body having a storage chamber provided with an opened front surface, doors provided on the front surface of the main body for opening and closing the storage chamber, and handles respectively provided on the doors, extending the longitudinal direction of the doors and having a hollow rod shape, said handle comprising:

a first resin layer making the shape of the handle and made of a first resin comprising glass fibers for reinforcing the rigidity of the handle; and a second resin layer formed on the outer surface of the first resin layer and made of a second resin, wherein the ratio of the total thickness of the handle and the thickness of the second resin layer is 250:1-50:1.

4. A handle for a door of a refrigerator, which has a main body having a storage chamber provided with an opened front surface, doors provided on the front surface of the main body for opening and closing the storage chamber, and handles respectively provided on the doors, extending the longitudinal direction of the doors and having a hollow rod shape, said handle comprising:

a first resin layer making the shape of the handle and made of a first resin comprising glass fibers for reinforcing the rigidity of the handle; and a second resin layer formed on the outer surface of the first resin layer and made of a second resin, wherein the outer surface of the second resin layer has a protective film provided by coating the outer surface of the second resin layer with a liquid material.

5. A handle for a door of a refrigerator, which has a main body having a storage chamber provided with an opened front surface, doors provided on the front surface of the main body for opening and closing the storage chamber, and handles respectively provided on the doors, extending in the longitudinal direction of the doors and having a hollow rod shape being protruded forwardly in a curved line, said handle being integrally formed by extrusion using resin such that the cross section of the rear portion thereof is larger than the cross section of the front portion thereof, wherein the inner surface of the rear portion of the handle has thereon a protruding rib for increasing the cross section thereof.

6. The handle according to claim 5, further comprising:

a first resin layer making the shape of the handle and made of a first resin comprising glass fibers for reinforcing the rigidity of the handle; and a second resin layer formed on the outer surface of the first resin layer and made of a second resin, wherein the protruding rib is provided on the first resin layer.

7. The handle according to claim 6, wherein the second resin is ABS resin, and the first resin is a mixture comprising ABS resin of 70-90 percent by weight and glass fibers of 10-30 percent by weight.

8. The handle according to claim 7, further comprising a protective film provided on the outer surface of the second resin layer by coating the outer surface of the second resin layer with a liquid material.

9. The handle according to claim 4, wherein the second resin is ABS resin.

10. The handle according to claim 4, wherein the first resin is a mixture comprising ABS resin of 70-90 percent by weight and glass fibers of 10-30 percent by weight.

11. The handle according to claim 4, wherein the ratio of the total thickness of the handle and the thickness of the second resin layer is -250:1-50:1.

* * * * *